United States Patent [19]

Maki et al.

[11] Patent Number: 4,845,734
[45] Date of Patent: Jul. 4, 1989

[54] EXPANDABLE CARRIAGE FOR SPOT-FILM DEVICE

[75] Inventors: Michael D. Maki, Hartland; Darrell J. Miller, Waukesha; Duane A. Filtz, Milwaukee; Robert B. Hauck, Delafield, all of Wis.

[73] Assignee: General Electric Company, Milwaukee, Wis.

[21] Appl. No.: 674,122

[22] Filed: Nov. 21, 1984

[51] Int. Cl.$^4$ ............................................. G03B 42/02
[52] U.S. Cl. ..................................... 378/181; 378/172
[58] Field of Search ......................... 378/181, 172, 176

[56] References Cited

U.S. PATENT DOCUMENTS

| | | | |
|---|---|---|---|
| 2,921,202 | 1/1960 | Berger et al. | 378/176 |
| 3,968,374 | 7/1976 | Schroeder | 378/181 |
| 3,986,034 | 10/1976 | Wittkopp et al. | 378/181 |
| 4,105,920 | 8/1978 | Pury et al. | 378/176 |
| 4,250,388 | 2/1981 | Jann | 378/176 |
| 4,489,428 | 12/1984 | Schwieker | 378/181 |

Primary Examiner—Craig E. Church
Assistant Examiner—John C. Freeman
Attorney, Agent, or Firm—Douglas E. Stoner

[57] ABSTRACT

A spot-film device includes an inner carriage whose three members are movable with respect to an outer carriage to provide a cassette tray that will accommodate varying cassette sizes. After insertion of a cassette, the inner carriage automatically contracts to a clamping position and is then movable longitudinally of the table to provide selective placement of the cassette for x-ray exposure. Lateral movement for that purpose is brought about by movement of the outer carriage. A single motor is used to provide both longitudinal clamping and longitudinal transport of the cassette while another motor provides both lateral clamping and lateral transport thereof. The lateral drive mechanism also provides for automatic ejection of a cassette after exposure.

17 Claims, 3 Drawing Sheets

PRIOR ART Fig.1
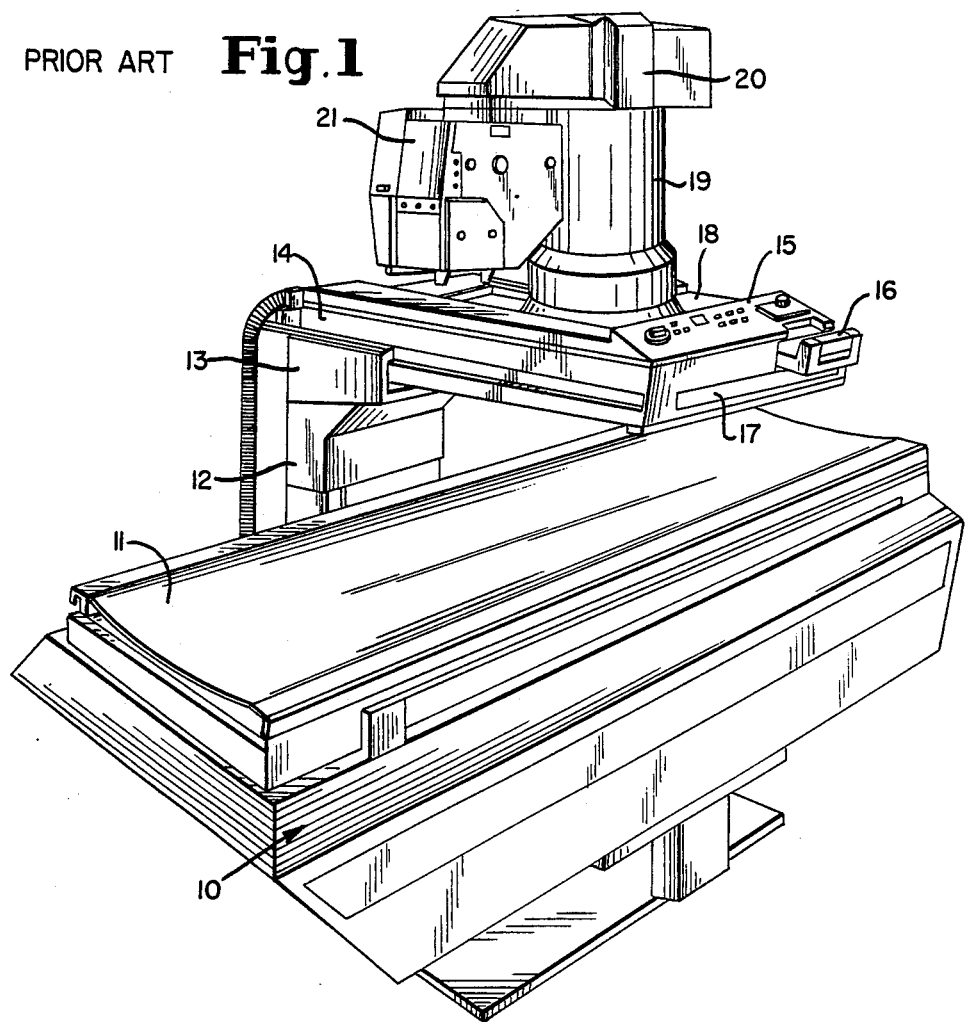
Fig.2
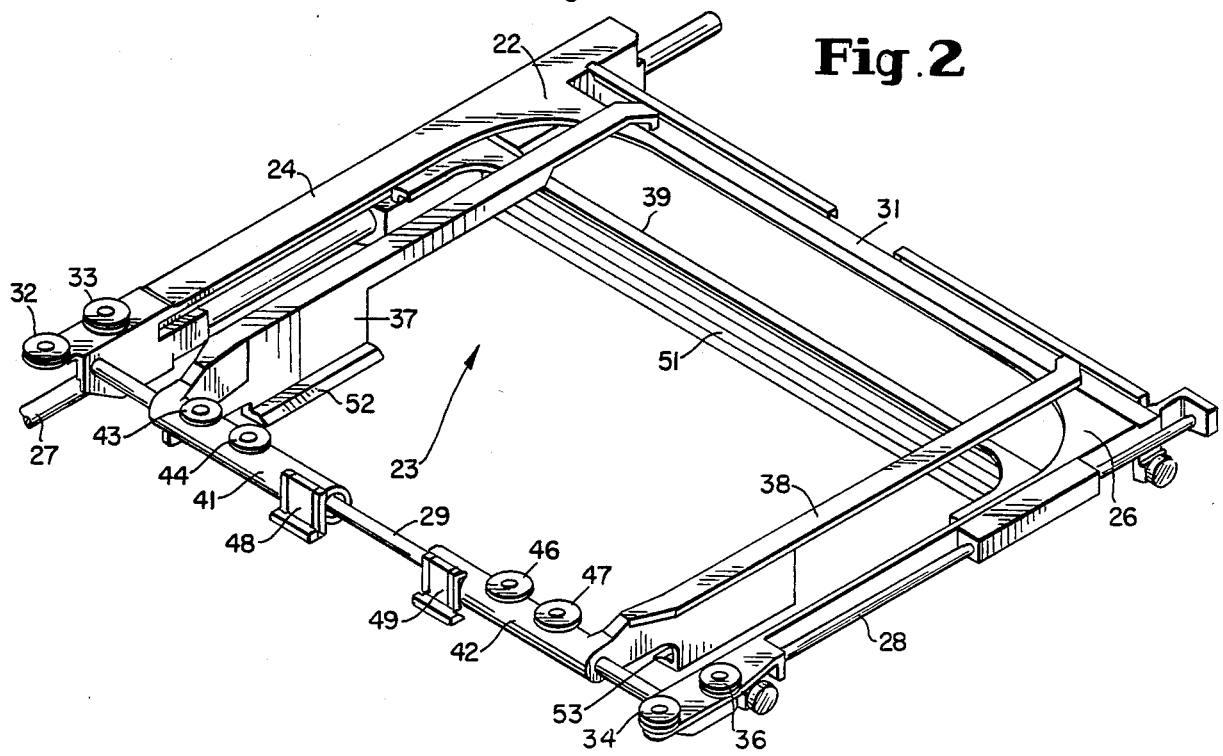

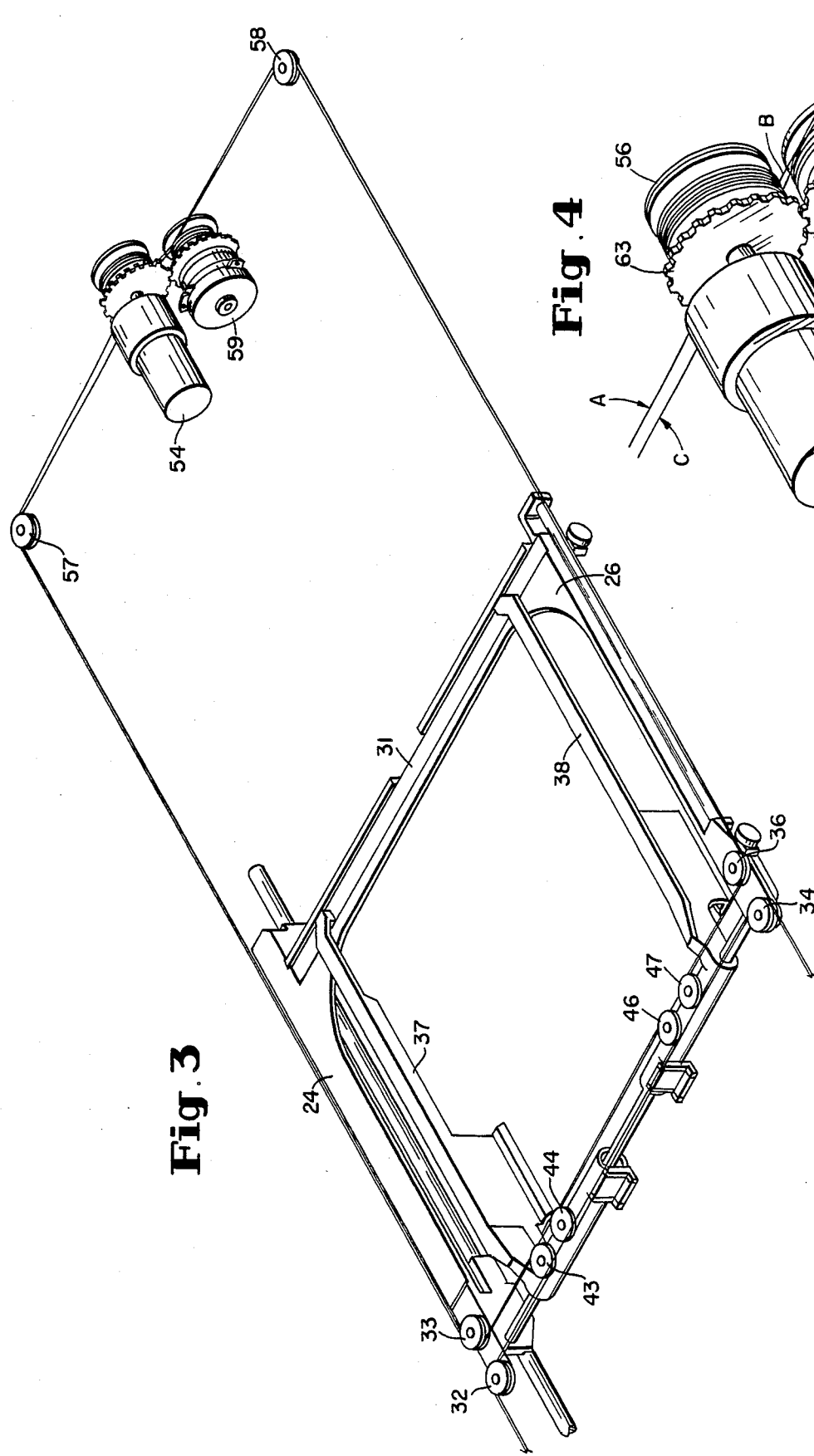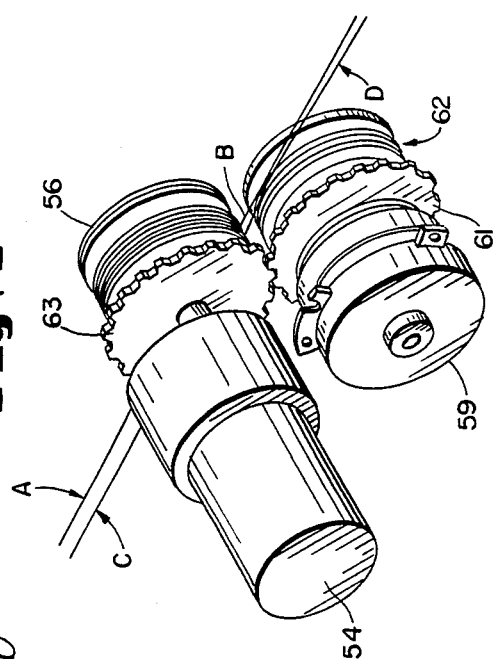

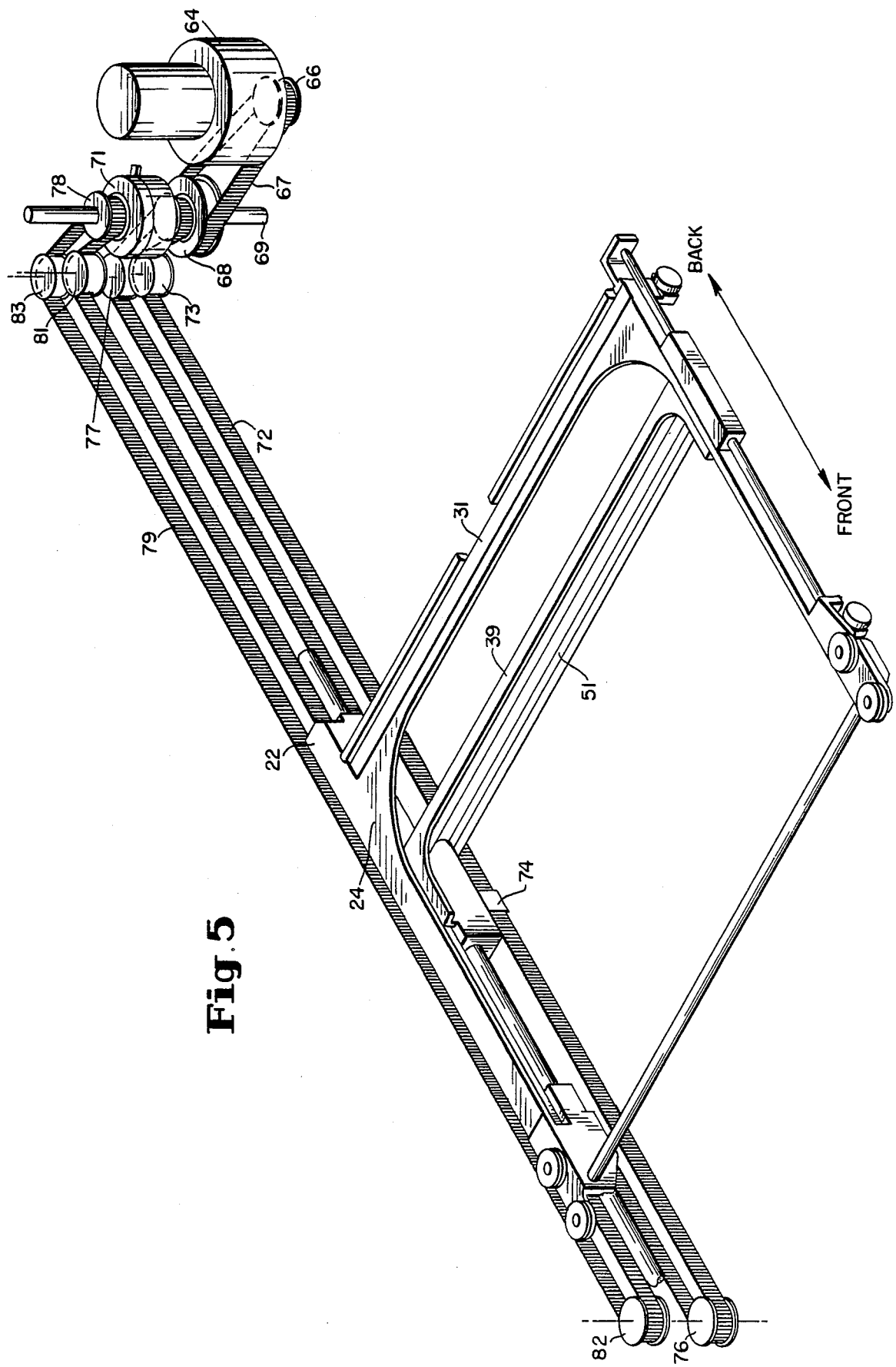

EXPANDABLE CARRIAGE FOR SPOT-FILM DEVICE

BACKGROUND OF THE INVENTION

This invention relates generally to spot-film devices for x-ray diagnostic equipment and, more particularly, to an inner carriage structure which can be selectively varied in size to accommodate various sized film cassette trays.

Spot-film devices are conventionally used in medical diagnostic practice to record x-ray images on film. The devices are normally provided as an integral part of a patient support table, extending transversely over the table in a cantilevered manner and supported by a vertical column extending up from the rear of the table. The device is commonly movable both in the longitudinal and transverse directions to accommodate the desired positioning with respect to a patient on the table below. Similarly, the x-ray tube, which is mounted within the table below the patient, is adapted for longitudinal and transverse movement, such that vertical alignment with the spot-film device can be maintained.

In addition to the longitudinal and lateral movement of the spot-film device, itself, provision is commonly made for rapid movement of the film cassette within the spot-film device so as to selectively expose a desired portion of the film contained therein. This is normally accomplished with the use of a carriage which is movable both laterally and longitudinally within the spot-film device to selectively place the cassette in the parked position or in one of the available positions to be exposed. Exposure may be accomplished in a single large radiograph, or in halves, thirds, quarters, sixths, ninths, or other portions of the whole film, as desired. Provision is then made to move the carriage to a position where the cassette can be removed from the spot-film device. U.S. Pat. No. 4,105,920 is indicative of prior art spot-film devices.

The size of film cassettes has heretofore been somewhat standardized with most cassettes being either 9½ inches square or 24 centimeters square. The spot-film devices have thus had carriages which were designed and built in one size which would accommodate either of those, almost identical sized cassettes. Neither smaller nor larger cassettes could be accommodated in that same spot-film device.

There is now a desire in medical diagnostic applications to use larger x-ray cassette sizes during radiological exams. For example, there is now a market demand for cassettes sizes of 10×12 inches, 24×30 centimeters, 14×14 inches, and 35×35 centimeters. If present spot-filmer designs were employed, one would be required to select from those sizes and then to design and build the carriage accordingly. The spot filmer would then be useful with only the selected cassette size.

There are, in addition to the conventional fixed-dimension cassette carriages, existing carriages with variable sizes that may accommodate, with some difficulty, different sized cassettes. However, they are generally observed to include spring-loaded mechanisms and/or complicated belt and chain arrangements that are difficult and inconvenient to use. This is especially so during the unloading and loading procedures.

It is, therefore, an object of the present invention to provide a spot-film device which accommodates larger size cassette trays.

Another object of the present invention is the provision for a spot-film device which is not restricted to use with a single size cassette.

Another object of the present invention is the provision for accommodating a range of cassette sizes that can be used with a single spot-film device.

Yet another object of the present invention is the provision for a variable sized cassette tray that is simple and convenient in operation and use.

Still another object of the present invention is the provision for a spot-film device which is simple and economical to manufacture and use.

These objects and other features and advantages become more readily apparent upon reference to the following description when taken in conjunction with the appended drawings.

SUMMARY OF THE INVENTION

Briefly, in accordance with one aspect of the present invention, a spot-film device is equipped with an inner carriage structure which is adjustable in size to accommodate various sizes of cassette trays. In the unloaded position, the inner carriage is automatically made to adjust to its largest size. When a cassette is inserted into an opening, provision is made for the inner carriage structure to contract to the point where it clamps the cassette in a proper-fit relationship. The cassette, with its clamping inner carriage, can then be moved both longitudinally and laterally within the spot-film device to place the film in the desired exposure position.

By another aspect of the invention, the inner carriage is comprised of a pair of side arms that are relatively movable on the outer carriage to expand and contract the inner carriage to accommodate the cassette size. The side arms are also movable in unison to move the cassette longitudinally within the spot filmer, once it is in the clamped position. Both of these movements are accomplished with a single motor when selectively used with a clutch-activated drum.

By yet another aspect of the invention, the inner carriage includes a rear member which can be moved relative to the outer carriage to vary the transverse dimension of the inner carriage to thereby clamp the cassette in position. Once the cassette is clamped into position, the rear member is then moved in unison with the outer carriage to place the cassette in the proper transverse position for exposure. Again, both the clamping movement and the transporting movement of the rear member is accomplished with a single motor, with the particular function at any one time being determined by the position of the clutch/brake mechanism.

In the drawings as hereinafter described, a preferred embodiment is depicted; however, various other modifications and alternate constructions can be made thereto without departing from the true spirit and scope of the invention.

BRIEF DESCRIPTION OF THE DRAWINGS

FIG. 1 is a perspective view of typical diagnostic x-ray table system with a spot-film device in which the present invention may be employed;

FIG. 2 is a perspective view of the inner and outer carriage portions of the invention;

FIG. 3 is a perspective view of the longitudinal drive assembly for the inner carriage portion of the invention;

FIG. 4 is an enlarged view of the motor and clutch portion of the longitudinal drive assembly; and FIG. 5 is a perspective view of the lateral drive assembly for the inner and outer carriage portions of the invention.

DESCRIPTION OF THE PREFERRED EMBODIMENT

Referring now to FIG. 1, a typical x-ray diagnostic table is shown at 10 to include an x-ray-transmissive table top 11 and a vertically extending column 12. The column 12 is movable longitudinally along the rear of the table and includes at its top a pair of spaced flanges 13 for slidably receiving a spot-film device 14 therein. Contained within the spot-film device 14 are the inner and outer carriages, together with their associated drive mechanisms in accordance with the present invention.

Operation of the table 10 and the spot-film device 14 is controlled by way of the operator's panel 15 and the control handle 16. Film cassettes are inserted into the spot-film device 14 by way of an opening 17 in the forward end of the spot-film device, or by way of a similar opening (not shown) at the rear of the device. Briefly, the film cassette is inserted into the spot-film device and the handle 16 is used to move the spot-film device to the desired position with respect to the patient lying on the table top 11. The spot-film device 14 is then programmed to operate in the desired manner by the operator's setting of the control panel 15.

The spot filmer 14 has a cover 18 with an image intensifier 19 mounted thereto in a conventional manner. Also associated with the image intensifier 19 is a conventional housing 20 which optically connects a cine recording camera 21 and a video camera (not shown).

Movably disposed within the spot-film device 14 is an outer carriage 22 and inner carriage 23 as shown in FIG. 2. The outer carriage comprises a pair of side frames 24 and 26 with respective side rails 27 and 28 connected thereto and extending in a transverse direction with respect to the table 10. At the front and rear of the outer carriage 22 is a front rail 29 and rear rail 31, respectively, which interconnect the side frames 24 and 26 to form a rigid structure of a fixed size which is transportable within the spot film device in a direction transverse to the table 10 as will be explained more fully hereinafter. In order to facilitate the movement of the inner carriage 23 with respect to the outer carriage 22, as will be described below, the side frame 24 is provided with sheaves 32 and 33, and side frame 26 is provided with sheaves 34 and 36.

The inner carriage 23 is mounted to the outer carriage 22 and comprises a pair of longitudinally spaced side arms 37 and 38 and a rear member 39. The side arms 37 and 38 are mounted to the front rail 29 of the outer carriage 22 by way of integral sleeves 41 and 42, respectively, and are slidably engaged with and supported by the outer carriage rear rail 31. Each of the sleeves 41 and 42 is independently slidable on the front rail 29 to move its arm in the longitudinal direction of the table. The arms 37 and 38 are so moved either relative to each other to facilitate a clamping of the cassette or in unison to accomplish a transporting of the loaded cassette in the longitudinal direction of the table. Each of these movements will be described hereinafter with reference to FIGS. 3 and 4. In addition to the sheaves 32, 33, 34 and 36, mentioned above, the sheaves 43 and 44 on the sleeve 41 and the sheaves 46 and 47 on the sleeve 42 are used for that purpose. A pair of pins 48 and 49 are also provided on the sleeves 41 and 42, respectively, for the purpose of sensing the position of the cassette, as will be more clearly understood with reference to the drive system discussed hereinafter.

Completing the inner carriage is the rear member 39 which extends parallel to the rear rail 31 and is slidably connected at its ends to the side rails 27 and 28 as shown. The rear member 39 includes a forwardly extending flange 51 which, together with the inwardly extending flanges 52 and 53 of the side arms 37 and 38, respectively, forms a three-sided tray for supporting the film cassette disposed therein.

The rear member 39 is selectively movable with respect to the outer carriage 22 by sliding movement on the side rails 27 and 28 to accomplish a clamping effect on a film cassette, the degree of transverse movement being determined by the size of the cassette installed. Alternatively, after the cassette has been clamped into position, the rear member 39 may be transported in unison with the outer carriage 22 to move the cassette to the desired transverse position within the spot-film device 14. The manner in which this is accomplished will be clearly seen with reference to FIG. 5 to be described hereinafter.

Reference is now made to FIGS. 3 and 4 wherein the drive mechanisms are shown for both the longitudinal clamping motion of the side arms 37 and 38, and the longitudinal transport motion of the cassette after it has been clamped into position.

At the rear end of the spot-film device 14 a motor drive mechanism 54, such as a D.C. motor, is drivingly attached to a takeup drum 56. A cable A is connected to and wound around the takeup drum 56 with its end then extending toward a double-sheave arrangement 57. Similarly, a second cable B is attached to and wound around the drum 56 in the same direction with its end extending toward the double sheave 58. The cable A then passes from the sheave 57 to sheave 33, to sheave 46, to sheave 32, and is then anchored to the outer frame of the spot-film device 14. The cable B passes from sheave 58 to sheave 36, sheave 47 and sheave 34 and is then anchored to the frame. Thus, rotation of the drum 56 acts to simultaneously take up one of the cables A or B while letting out the other and in doing so acts to move the arm 38. With this arrangement, it will thus be seen that an activation of the d.c. motor 54 in one direction will rotate the takeup drum 56 to move the side arm 38 in one direction toward or away from the other side arm 37. Similarly, an activation of the motor 54 in the opposite direction will move the side arm 38 in the opposite direction with respect to the side arm 37. In this way, the maximum spacing between the side arms 37 and 38 can be made to accommodate the largest size cassette that one might want to use. Then, regardless of the cassette size, the side arm 38 may be made to move by actuation of the motor 54 as described so as to clamp the cassette between the two side arms 37 and 38.

Leaving aside for later discussion the movement of the rear member 39 as part of the clamping function, the transport function of the cassette after it has been clamped in place will now be described. This second function will be accomplished with the use of the d.c. motor 54 in the following manner. Referring to FIG. 4, it will be seen that a clutch/brake mechanism 59 is provided adjacent the drive motor 54. A suitable device for this use has been found to be a Model CSB-19C Clutch/Brake which is commercially available from the Electroid Corporation. Associated with the clutch/brake 59 is a driven gear 61 and a takeup drum 62. The takeup drum 62 has wound around it, in the opposite direction to that of the winding around the takeup drum 56 described above, a cable C with its end extending as shown and a cable D extending in the opposite direction as shown. Drivingly engaged with the driving gear 61 on the clutch/brake 59 is a driving gear 63 which is associated with the takeup drum 56 and which rotates with the drive motor 54. The driving gear 63 is always engaged with the driven gear 61 such that the driven gear 61 is rotated with the drive motor 54, but in the opposite direction. However, the takeup drum 62 does not rotate with the driven gear 61 until the clutch 59 is engaged. Until that time, the clutch/brake 59 acts as a brake to the takeup drum 62 to hold its cable B in a fixed position. When the clutch 59 is engaged, the takeup drum 62 begins to rotate with the driven gear 61 to move the cables C and D in directions determined by the direction of rotation of the motor 54.

The cable C extends to the sheave 57 and then forwardly to the inner carriage structure passing over sheave 33, sheave 43, and sheave 32, and eventually to the frame. The cable D passes over sheaves 58, 36, 44, and 34 to then attach to the frame. With this arrangement, it will be seen that the drum 62 and its connected cables act to move the side arm 37 across the front rail 29 in a direction which is determined by the direction of rotation of the drive motor 54. Thus, when operating in this mode, the drum 56 functions to move the side arm 38 while the drum 62 functions to move the side arm 37 in the same direction and in unison with the movement of the side arm 38. It is this movement which is selectively employed to place the film cassette in the desired longitudinal position for x-ray exposure.

Referring now to FIG. 5, there is shown the drive mechanism for both moving the inner carriage rear member 39 into and out of its clamping position, as well as the drive mechanism for moving the rear member 39 in unison with the outer carriage 22 to transversely locate the cassette after it has been clamped into position. The motor drive mechanism 64, such as a D.C. motor, is provided to drive a pulley 66 in either direction with the pulley 66 acting to drive a belt 67. The belt 67 is engaged with a pulley 68 which is mounted for rotation either on or with a shaft 69 depending on the mode of operation. The shaft 69 extends upwardly to a brake/clutch assembly 71 which is applied to selectively actuate the cassette transport function as will be described hereinbelow.

The pulley 68 has, in addition to the lower portion which is engaged by the belt 67, an upper portion which is drivingly engaged with a second belt 72. The belt 72 passes over sheave 73 and then extends transversely across the table toward the front of the spot-film device where it is attached to the inner carriage rear member 39 at 74. It then passes over a sheave 76 and back to a sheave 77 before returning to the pulley 68. It is this belt drive mechanism which is selectively applied to move the inner carriage rear member 39 with respect to the side rails of the outer carriage 22 to clamp and unclamp the cassette in the transverse direction.

After the clamping has been accomplished, the clutch/brake mechanism 71, which can be of the type specified for the clutch/brake 59 described hereinabove, is actuated to facilitate the transport of the cassette in the transverse direction. During the clamping operation described above, when the clutch/brake mechanism 71 is in the braking mode, the outer carriage 22 is held tightly in a fixed position. When the clutch/brake 71 is engaged in the clutch position, the pulley 68 becomes drivingly connected with the shaft 69 to which the upper pulley 78 is rigidly attached by journalling or the like. A belt 79 is drivingly engaged with the pulley 78 and passes over sheave 81 and extends forward to attach to the outer carriage 22 and then passes around sheave 82 and returns via the sheave 83 to the pulley 78. It will thus be seen that when the clutch 71 is engaged, the drive movement of the motor 64 will move the rear member 39 in the transverse direction by way of the belt 72, while at the same time, the motor movement will act through the belt 79 to cause the outer carriage 22 to move in unison with the rear member 39. After the cassette has been transported to the various transverse locations as desired for exposure, an unloading of the cassette can then be accommodated by first disengaging the clutch 71, which locks the outer carriage 22 in a fixed position and allows the rear member 39 to move rearwardly relative thereto to release the cassette.

In operation, cassette loading is accomplished by first inserting the cassette into the opening 17 as shown in FIG. 1. In the lower surface of the spot-film device there is a plate (not shown) on which the cassette is allowed to rest during the insertion process. As the cassette is inserted, it passes under the pins 48 and 49 as shown in FIG. 2 and eventually clears the beam of an optical transmitter and receiver combination which is disposed in parallel relationship with the front rail 29. This is a signal that the cassette has now been inserted and that the clamping operation can proceed. The side arm 38 and the rear member 39 of the inner carriage are then automatically caused to move into their clamping positions to the extent determined by the cassette size. As the rear member 39 moves forward to its clamping position, the cassette is caused to engage the two pins 48 and 49 on the front rail 29. With the clamping motion, the carriage will tend to align cassettes which have been inserted at skewed angles to the side arms and rear member. The clamping force that is exerted by the side arm 38 and the rear member 39 is controlled by torque limiters to the drive motors 54 and 64 to minimize the impact force created during the clampdown.

After the cassette is clamped into position, it is then moved laterally and/or longitudinally in the manner described hereinabove to obtain exposure of the film in a desired pattern and locations. The positions of the inner and outer carriages 22 and 23 are monitored by way of potentiometers that are interfaced with the drive systems. Potentiometers are also attached to each cable drum to provide exact side arm positioning feedback.

After the desired x-ray exposures have been taken, the outer carriage is moved to either the front or rear park positions. In a controlled sequence, the two drive motors and clutch/brake mechanisms are actuated such that the side arms 37 and 38 and the rear member 39 are positioned for cassette removal. During this operation, the side arms 37 and 38 are made to expand while the rear member 39 is caused to move in the forward rear-load direction to eject the cassette through the beam of the optical transmitter and under the buttons 48 and 49 to the point that an operator may then grasp the cassette and complete the removal process. When that occurs, the operation of the optical sensor combination causes the carriage components to return to a load condition where they are ready for receiving the next cassette.

The carriage and drive mechanism just described has been shown and discussed in terms of use with the front loading feature most common in the industry. It should be mentioned that the particular spot-film device with which this was designed to operate, also includes a rear loading capability wherein a cassette may be installed and removed from a door in the top 18 of the spot-film device 14 near the rear section thereof. After insertion of the cassette, the clamping and transport mechanisms operate in the same manner as described hereinbefore with respect to the front loaded cassette.

It will be understood that the invention has been described in terms of a particular structure relating to one embodiment of the invention and that other forms and structures may be used while remaining within the scope of the invention.

Having thus described the invention, what is claimed is now desired to be secured by Letters Patent in the United States is:

1. An improved carriage for receiving and transporting a film cassette and x-ray spot-film device extending laterally across a patient support table comprising:
   an outer carriage having frame means that includes laterally spaced front and rear rails and longitudinally spaced side rails;
   an inner carriage comprising a pair of longitudinally spaced side arms supported at their ends by the front and rear rails and a rear member supported at its ends by said side rails;
   flange means on said side arms and said rear member for receiving and supporting a cassette for x-ray exposure;
   means for effecting relative longitudinal movement of said side arms comprising longitudinal clamping motor drive means that holds one of said side arms stationary and moves the other one of said side arms theretoward to clamp a cassette therebetween;
   means for effecting relative lateral movement of said rear member with respect to said outer carriage, said relative longitudinal movement means and said relative lateral movement means acting together to accommodate different sizes of cassettes;
   means for moving said side arms in unison to transport the cassette to a desired longitudinal position within the spot-film device; and
   means for moving said outer carriage to transport the cassette to a desired lateral position within the spot-film device.

2. An improved carriage as set forth in claim 1 wherein said side arms are slidably attached to said front rail.

3. An improved carriage as set forth in claim 1 wherein said rear member is slidably attached to said side rails.

4. An improved carriage as set forth in claim 1 wherein said lateral movement means comprises lateral clamping motor drive means to move said rear member on said side rails in a direction toward said front rail to clamp a cassette in place.

5. An improved carriage as set forth in claim 1 wherein said means for moving said side arms in unison comprises longitudinal transport motor drive means for moving said side arms on said front rail.

6. An improved carriage as set forth in claim 4 wherein said means for moving said outer carriage comprises lateral transport motor drive means for moving said outer carriage together with the support inner carriage in the lateral direction.

7. An improved carriage as set forth in claim 5 wherein a single motor is used for said longitudinal clamping motor drive means and said longitudinal transport motor drive means.

8. An improved carriage as set forth in claim 6 wherein a single motor is used for said lateral clamping motor drive means and said lateral transport motor drive means.

9. An improved carriage as set forth in claim 1 and including means for partially ejecting a cassette from its position on said flanges such that it extends outwardly from said spot-film device.

10. An improved carriage as set forth in claim 9 wherein said ejection means comprises a motor means that drives said rear member laterally against the cassette to effect ejection.

11. In a spot-film device of the type having an inner carriage for receiving a film cassette and for transporting it to selective positions longitudinally across an x-ray table and an outer carriage for supporting the inner carriage and transporting it to selective positions transverse with respect to the x-ray table, an improved clamping and transport apparatus comprising:
   clamping drive means for selectively varying the size of the inner carriage to accommodate cassettes of various transverse and longitudinal dimensions, said clamping drive means including a first drive motor;
   first transport drive means for moving the inner carriage to selected longitudinal positions within the spot-film device; and
   first clutch means associated with said first transport drive means and engagable to cause said first drive motor to drive said first transport drive means.

12. An improved clamping and transport apparatus as set forth in claim 11 wherein said clamping drive means includes a second drive motor and further including:
   second transport drive means for moving the outer carriage to selected transverse positions within the spot-film device; and
   second clutch means associated with said second transport drive means and engagable to cause said second drive motor to drive said second transport drive means.

13. An improved clamping and transport apparatus as set forth in claim 11 wherein said clamping drive means includes a pair of longitudinally spaced side arms which are moved relative to each other to clamp a film cassette therebetween.

14. A improved clamping and transport apparatus as set forth in claim 13 wherein one of said side arms remains stationary and the other is driven toward it by said clamping drive means.

15. An improved clamping and transport apparatus as set forth in claim 11 wherein said clamping drive means includes a rear member which is moved laterally within the spot-film device to clamp a film cassette in place.

16. An improved clamping and transport apparatus as set forth in claim 13 wherein said clamping drive means includes a cable interconnecting said first drive motor with at least one of said side arms.

17. An improved clamping and transport apparatus as set forth in claim 12 wherein said clamping drive means includes a cable interconnection interconnecting said second drive motor to said second transport drive means.

* * * * *